June 26, 1962     J. J. ALOSKY     3,040,380
APPARATUS FOR MOLDING THERMOPLASTIC SHEETS
Filed Dec. 22, 1960     2 Sheets-Sheet 1
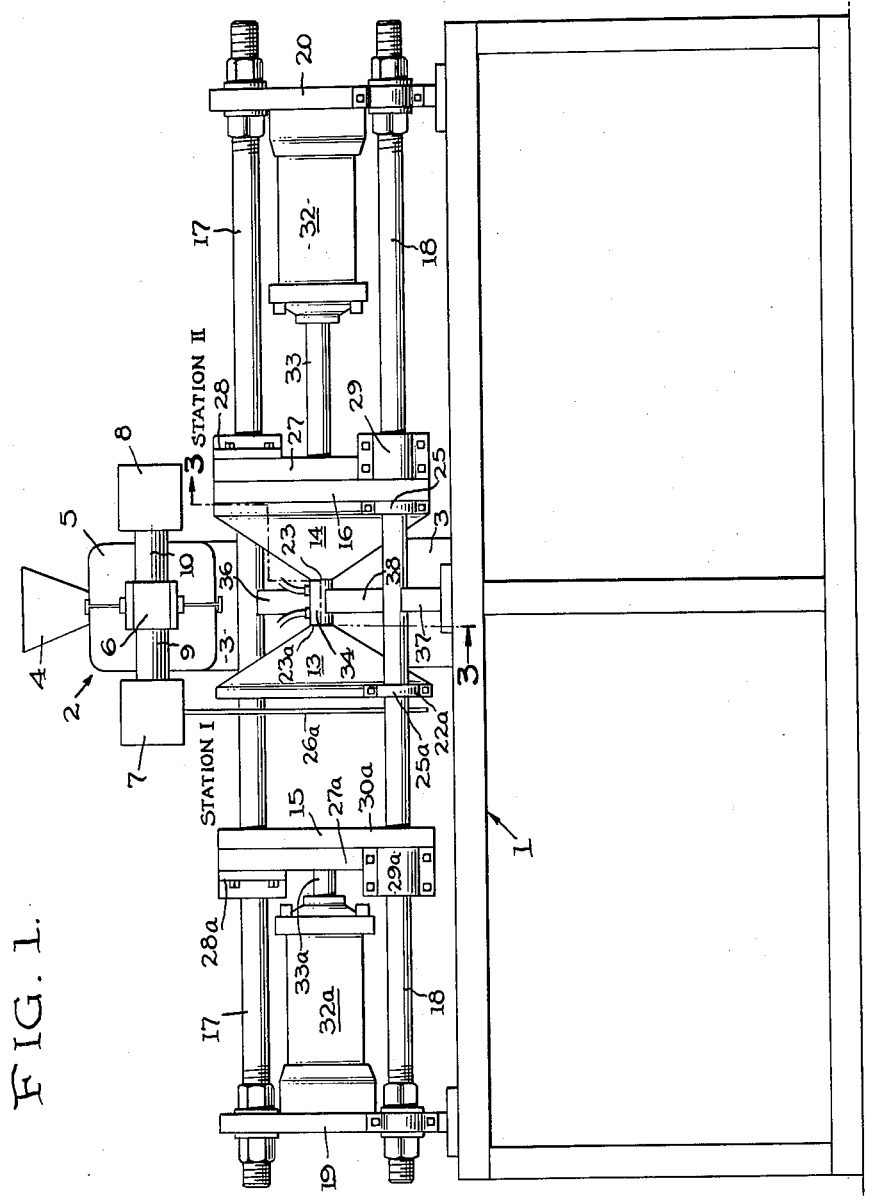
FIG. 1.
INVENTOR
JOSEPH J. ALOSKY
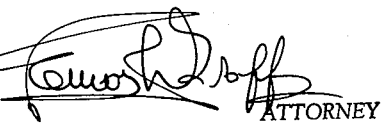
BY
ATTORNEY June 26, 1962  J. J. ALOSKY  3,040,380
APPARATUS FOR MOLDING THERMOPLASTIC SHEETS
Filed Dec. 22, 1960  2 Sheets-Sheet 2
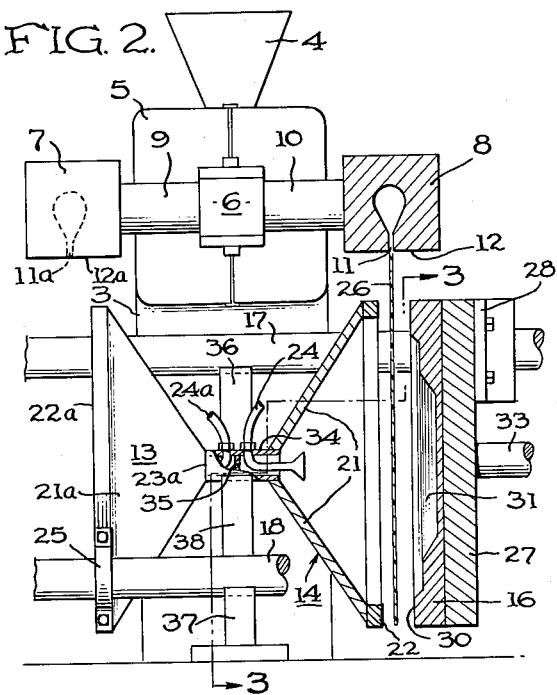
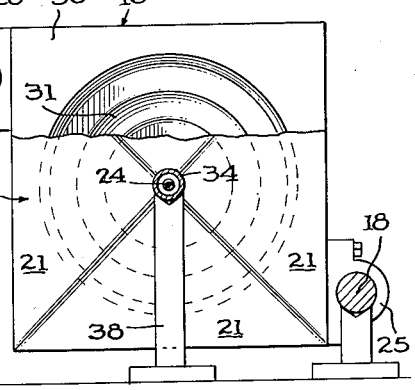
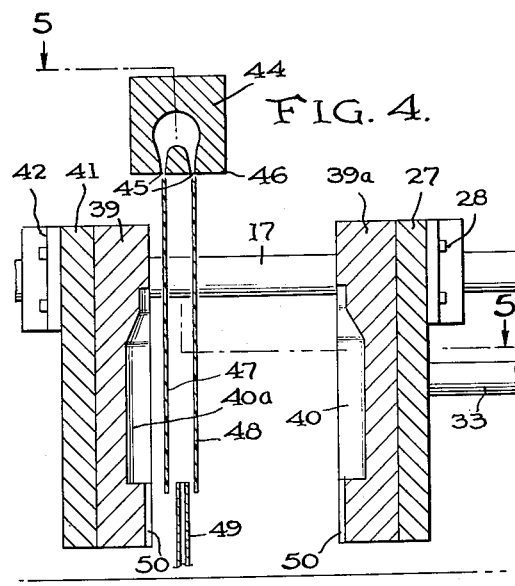
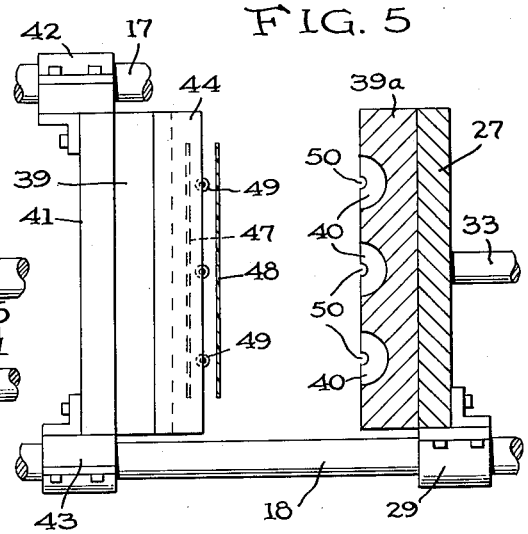
INVENTOR
JOSEPH J. ALOSKY
BY
ATTORNEY

# United States Patent Office 3,040,380
Patented June 26, 1962

3,040,380
APPARATUS FOR MOLDING THERMOPLASTIC SHEETS
Joseph J. Alosky, R.F.D. 2, Salem Depot, N.H.
Filed Dec. 22, 1960, Ser. No. 77,673
1 Claim. (Cl. 18—19)

This invention relates generally to molding apparatus, and more particularly to apparatus for molding thermoplastic sheet materials.

In the shaping of plastic sheet material, it has been the usual practice to separately produce a sheet of plastic composition, such as vinyl resin; secure the sheet over a female or male mold; apply means to heat the sheet to moldable temperature; and either simultaneously or subsequently press the sheet in the female or male mold by means of a complementary mold, or apply vacuum suction. It is then necessary to wait until sufficient time has elapsed to permit cooling and hardening of the molded plastic before the molds may be separated and the shaped article removed. The necessary time required for the above cycle to transpire is quite undesirable and expensive.

Accordingly, it is a primary object of this invention to provide a molding apparatus which includes plastic extruding means for delivering ready-to-mold plastic sheet material directly to a female mold.

Another object of this invention is to provide a molding apparatus including a pair of reciprocably mounted mold cavities each cooperating with a separate plastic sheeting die, the operation of the mold cavities and sheeting dies being synchronized to provide for the continuous production of shaped plastic articles.

Another object of this invention is to provide a two-station molding apparatus having a pair of fixed blow-tubes each of which alternately cooperates with one of a pair of reciprocating female mold sections.

A still further object of this invention is to provide a two-station molding apparatus which may be readily adapted to continuously produce convex, concave, or any other shaped articles from single sheets of plastic, or hollow articles such as bottles from double sheets of plastic material.

Other objects and advantages of the invention will be apparent from the specification and claim when considered in connection with the drawings in which:

FIGURE 1 is a front view showing in elevation the molding apparatus according to the subject invention.

FIGURE 2 is an enlarged view of the central portion of the molding apparatus illustrated in FIGURE 1 and shows in section the plastic sheeting dies, blow-tubes and the female mold of one station.

FIGURE 3 is a partical elevation view of one of the blow-tubes and its cooperating mold section as taken on the line 3—3 of FIGURE 2.

FIGURE 4 is a sectional view of a modified sheeting die and a pair of mold sections as adapted for producing hollow articles.

FIGURE 5 is a top view partly in section, of the modified apparatus shown in FIGURE 4 and taken on the line 5—5 thereof.

Referring now more particularly to the drawings, especially FIGURE 1, it will be seen that the molding apparatus of the invention is a compact, self-contained, assembly wherein all the required elements for continuously making convex or concave or hollow shaped articles from plastic sheet material may be conveniently arranged upon a single table or support 1.

By way of example, the drawings illustrate the use of female mold sections although it will be understood that male molds or other shaped molds may be used in connection with the invention to produce convex, concave, or other shaped articles.

Broadly, the invention comprises a pair of alternately operating molding stations generally designated I and II and including means for mixing and extruding sheets of moldable plastic to supply the stations.

A plastic mixing and extruding assembly generally designated 2, is supported above the mold sections by means of mounting plate 3, and includes a hopper 4 for receiving the raw plastic material which may be supplied in any usual form such as granules. A mixing chamber 5 which is of conventional design, produces from the raw plastic material a fluent plastic-composition at an elevated temperature capable of being molded and thereafter retaining its molded shape due to its thermoplastic property. The heated fluent plastic composition is directed from the mixing chamber 5 to an interlock valve 6 centrally disposed over the molding sections. A pair of extrusion dies 7 and 8 of identical construction are connected to opposite sides of the valve 6 by means of pipe-like heavy wall channels 9 and 10, respectively.

The particular internal arrangement of the valve 6 is not shown as it may comprise any suitable type of two-way valve mechanism having a single intake leading to a pair of outlets, both of which may be simultaneously closed and only one of which may be opened at a time. Thus, it will be seen that during the operation of the apparatus, the heated fluent plastic composition supplied by the mixing chamber 5 to the interlock valve 6 may be directed by said valve to either one of the extrusion dies 7 or 8 through channels 9 or 10, respectively.

Referring to FIGURE 2, it will be noted that the dies 7 and 8 are each provided with a discharge opening 11, 11a along its lower surface 12, 12a.

A pair of molding sections, each comprising a fixed blow-chamber 13 or 14 and a movable female mold 15 or 16 are mounted upon columns 17 and 18 which in turn are supported by backing plates 19 and 20 anchored to the table 1.

If a vertical line were drawn through the inter-lock 6 down through the apparatus it would be seen that the elements of the invention would be divided into two symmetrical portions namely, Station I and Station II. Inasmuch as both stations are of similar construction, it will only be necessary to describe one such station.

Station II will be described in detail with reference to FIGURES 1, 2 and 3. The blow-chamber 14 comprises four walls 21 arranged to form a hollow chamber having the shape of a pyramid and provided with a flat sealing face 22 forming its base. Disposed within the apex 23 of the chamber is a blow-tube 24 which is connected to a suitable source of compressed air (not shown). Clamps 25 secured to columns 17 and 18 support the blow-chamber 14 in a fixed position such that the sealing face 22 is disposed substantially adjacent the vertical axis formed by a sheet of plastic material 26 extruded from the die 8.

A platen 27 mounted in opposed relationship to the face 22 of the blow-chamber 14 is attached to columns 17 and 18 by means of bearing blocks 28 and 29 which may be provided with bushings to permit sliding or reciprocating movement of the platen along the columns 17 and 18.

As most clearly shown in FIGURE 2, the platen 27 serves as a support for retaining the female mold section 16. Any suitable means may be used to secure the mold 16 to the platen 27 such as an adhesive or mechanical fastening means.

The mold 16 is provided with a sealing face 30 opposite the face 22 of the chamber 14 such that when the air cylinder 32 anchored to the plate 20 is actuated to extend the piston rod 33 as shown in FIGURE 1, the faces 22 and 30 are each compressed against opposite sides of the plastic sheet 26 so that an air tight seal is obtained around these faces. It is to be noted that the overall dimensions of the cavity 31 of the mold 16 must not extend into the region of the opposed sealing face 22 of the chamber 14 for reasons which will later be apparent.

The blow-tubes 24, 24a are supported by, and enter the blow-chambers 13, 14 through a collar 34 joining the apices 23, 23a of the two chambers. A barrier plate 35 divides the collar interior into separate air tight sections leading into each of the chambers 13 and 14.

Additional supporting means comprising posts 36 and 37 support the medial portions of columns 17 and 18, respectively, while a similar post 38 supports the collar 34.

Cycle of Operation

The sequence of the movements of the various components of the molding apparatus will now be described in detail with reference to FIGURES 1-3, particularly FIGURE 1, wherein it will be noted tht the supporting posts 36—38 are in a plane which divides the apparatus into two symmetrical sections, Station I and Station II, designed for the continuous production of molded plastic articles.

We may consider that the apparatus as illustrated in FIGURE 1 is in the initial position of operation. Raw plastic material is fed to the mixing chamber 5 through the hopper 4 and by the proper application of heat, the raw plastic is converted to the fluid state, as it is directed to the interlock valve 6.

The valve 6 is opened to direct a predetermined amount of plastic through the pipe 9 to the extrusion die 7 included in the apparatus comprising Station I. As the plastic is extruded in sheet form from the discharge opening 11a of the die 7, it is formed into a flat sheet of soft plastic disposed parallel to but spaced from the blow-chamber 13, as shown in FIGURE 1. When the extruded sheet 26a is of a size sufficient to cover the outer dimensions of the sealing face 22a of the chamber 13, the valve 6 is closed. At the same time the cylinder 32a is actuated to move the platen 27a and its related female or male mold 15 to the right. This movement continues until the sealing face 30a of the mold 15 contacts the sheet 26a and compresses the sheet against the sealing face 22a of stationary blow-chamber 13. Thus, it will appear that at this point the plastic sheet 26a is firmly sandwiched between the mold 15 and the blow-chamber 13 so that as compressed air is admitted to the chamber 13 through the tube 24a, the plastic sheet 26a entrained within the perimeter of the sealing face 22a of the chamber 13 will be forced against the female or male mold 15 and into the recess of the cavity therein.

The mold 15 remains in its mated position with the blow-chamber 13 while the sheet 26a cools and sets to its molded shape. The compressed air in the chamber 13 assists in the cooling of the formed plastic and additional means such as water cooling passages (not shown) may be provided in the mold section 15 or platen 27a to accelerate the cooling of the molded plastic.

Meanwhile, the apparatus of Station II which remained idle during the extrusion stage in Station I, begins its cycle of extrusion and molding, which is identical to the steps described beforehand in connection with Station I.

As the plastic sheet 26 has been extruded between the spaced apart mold 16 and blow-chamber 14, the air pressure feeding into line 24a is turned off and the air pressure is exhausted from cylinder 32a to retract the mold 15 to the position illustrated in FIGURE 1. The cooled molded article is then removed from the section 15 of Station I while another plastic sheet is being molded at Station II.

It will thus be seen that while the apparatus comprising Station I is in operation to extrude and mold a sheet of plastic, the corresponding apparatus comprising Station II is in operation to cool and deliver a molded article, and vice versa.

FIGURES 4 and 5 illustrate a modified form of the invention adapted for the manufacture of hollow shaped articles.

This form of the invention is carried out under the same continuous production cycle described heretofore in connection with the preferred embodiment. It is necessary to substitute a pair of mold sections 39 and 39a for each of the cooperating blow-chambers 13, 14 and molds 15, 16 in order to produce molded hollow articles.

The mold 39a, as shown in FIGURES 4 and 5 is attached to the reciprocating platen 27 and is provided with a plurality of cavities 40 representing one half of the shaped articles. The other mold 39 is provided with a corresponding number of similarly disposed cavities 40a and is mounted upon a fixed platen 41 secured to the columns 17 and 18 by means of clamps 42 and 43, respectively.

In this modification, the extrusion die 44 has a pair of discharge openings 45 along its bottom surface 46. These openings 45 are parallel and spaced apart such that when plastic material is fed through the die 44, a pair of spaced apart plastic sheets 47, 48 will be extruded in proximity to the mold 39 and extending to at least overlie the overall dimensions of cavities 40a.

Disposed at the lower section of the molds 39, 39a are a plurality of blow tubes 49, one each projecting into the area of the bottom of each of the mold cavities formed by mating cavities 40 and 40a. The mold sections 39 and 39a are provided with semi-circular channels 50 which, when the molds are closed, grip the circumference of the tubes 49 to ensure an air tight seal within the cavities.

The tubes 49 are movably supported (not shown) so that during the extrusion of the plastic sheets 47, 48, the tubes are disposed between the two sheets as shown in FIGURE 4. The tubes are sufficiently spaced apart from the mold 39 so that as the sheet 47 is extruded, it will not strike against this mold. When the movable mold 39a is closed against the mold 39, the channels 50 in the mold 39a move the tubes 49 into sealing engagement with the channels 50 in the mold 39.

The sequence of operation for the modified apparatus is similar to that previously described, it being understood that the construction illustrated in FIGURES 4 and 5 is used in an apparatus including two stations as shown in FIGURE 1, with corresponding elements in both stations.

The primary difference between the operation of the two forms illustrated is that in the hollow article form, when the molds are closed, compressed air is introduced between a pair of sheets to expand them outwardly to match the shape of the cavities 40 and 40a. During this step, the hot moldable plastic sheets are joined together along seams at the juncture of the walls of cavities 40 and 40a such that complete hollow articles are formed. To accelerate the cooling and setting of the plastic after compressed air has molded the plastic sheets, suitable passageways (not shown) may be provided in the molds 39, 39a or platens 27, 41 for the circulation of a cooling medium.

I claim:

An apparatus for the continuous production of shaped articles from plastic material comprising, a plastic mixing and extruding assembly including a single plastic mixer supplying a plurality of extrusion dies having longitudinal discharge openings, a separate blow-chamber fixedly mounted beneath each of said dies, said blow-chambers each having an open end and a closed end, said open ends facing in outwardly directions and said closed ends disposed in back-to-back relationship beneath said mixing and extruding assembly, each of said open ends provided with a flat sealing face disposed in a plane parallel to the plane of said discharge opening, a single separate reciprocating mold cooperating with each of said blow-chambers and provided with a sealing face in opposed relationship to said sealing face on said blow-chambers, an interlock valve controlling the extrusion of a single sheet of plastic material alternately from said dies and between the sealing faces of each pair of cooperating blow-chambers and molds to permit extrusion at one blow-chamber and mold while a previously extruded plastic sheet in another mold is being cooled, fluid pressure cylinders for alternately moving each mold to and from engagement with its opposed blow-chamber to sandwich a sheet of plastic material between the sealing faces of said molds and blow-chambers, and means for alternately admitting compressed fluid to the interior of said fixed blow-chambers to displace the sandwiched plastic sheet against the cooperating molds.

References Cited in the file of this patent

UNITED STATES PATENTS

| | | |
|---|---|---|
| 2,515,093 | Mills | July 11, 1950 |
| 2,632,202 | Haines | Mar. 24, 1953 |
| 2,724,860 | Strong | Nov. 29, 1955 |
| 2,890,485 | Knowles | June 16, 1959 |
| 2,918,698 | Hagen et al. | Dec. 29, 1959 |

FOREIGN PATENTS

| | | |
|---|---|---|
| 1,138,504 | France | June 14, 1957 |
| 781,560 | Great Britain | Aug. 21, 1956 |
| 821,173 | Great Britain | Sept. 30, 1959 |